US006714838B2

(12) United States Patent
Scrymgeour et al.

(10) Patent No.: US 6,714,838 B2
(45) Date of Patent: Mar. 30, 2004

(54) DISPENSING LOTTERY TICKETS

(75) Inventors: Lyle Harold Scrymgeour, Dugald (CA); Douglas Pollard, Winnipeg (CA); Jack F. Hargrave, Pottawattamie County, IA (US); Terry L. Poffenbarger, Potawattamie County, IA (US); Bennie D. Childers, Pottawattamie County, IA (US); Martin E. Johnson, Pottawattamie County, IA (US); Michael T. Templeman, Pottawattamie County, IA (US)

(73) Assignee: Pollard Banknote Limited, Winnipeg (CA)

( * ) Notice: Subject to any disclaimer, the term of this patent is extended or adjusted under 35 U.S.C. 154(b) by 143 days.

(21) Appl. No.: 10/133,652

(22) Filed: Apr. 29, 2002

(65) Prior Publication Data

US 2003/0204288 A1 Oct. 30, 2003

(51) Int. Cl.[7] ........................................ G06F 17/00

(52) U.S. Cl. ....................... 700/242; 700/225; 273/139; 283/903; 463/17

(58) Field of Search ................................. 700/231, 232, 700/242, 243, 225; 283/903; 273/139; 463/17

(56) References Cited

U.S. PATENT DOCUMENTS

| | | | | |
|---|---|---|---|---|
| 4,608,487 A | | 8/1986 | Awane et al. | |
| 5,222,624 A | | 6/1993 | Burr | |
| 5,772,510 A | * | 6/1998 | Roberts | 463/17 |
| 5,927,541 A | * | 7/1999 | Stoken et al. | 221/2 |
| 6,347,794 B2 | * | 2/2002 | Scrymgeour et al. | 273/138.1 |
| 2001/0006181 A1 | | 7/2001 | Roberts et al. | |
| 2001/0034263 A1 | | 10/2001 | Roberts | |
| 2001/0048013 A1 | | 12/2001 | Roberts et al. | |
| 2001/0049986 A1 | | 12/2001 | Roberts et al. | |
| 2002/0100785 A1 | | 8/2002 | Roberts et al. | |

FOREIGN PATENT DOCUMENTS

| | | |
|---|---|---|
| CA | 2328854 | 10/1999 |
| EP | 0 439 355 A2 | 1/1991 |
| EP | 0 479 292 A2 | 10/1991 |
| WO | WO 89/05490 | 10/1989 |
| WO | WO 94/11848 | 5/1994 |

* cited by examiner

*Primary Examiner*—Khoi H. Tran
(74) *Attorney, Agent, or Firm*—Adrian D. Battison; Michael R. Williams; Ryan W. Dupuis

(57) ABSTRACT

The input of information into the control unit of a lottery ticket dispensing machine, for filling of dispensing containers of the machine with different game tickets, defining a game number for a game provided on the tickets, a price of the ticket, a total number of the tickets making up the quantity of tickets and a length of the tickets from a leading edge of each ticket to a trailing edge thereof is simplified so as to avoid requiring the service person to enter the information on a key pad as numerical values. This is effected by providing the information in machine readable form on the tickets themselves or on a game set up card associated with the tickets so that the information can be scanned into the control unit by a reader. Alternatively, the information can be provided in a simplified coded form for simple input by the service person into a key pad of the control unit. In a further alternative the control unit is arranged to communicate with a central data source which provides the information from the game number manually input by the service person.

20 Claims, 7 Drawing Sheets

| Value | Quantity | Length |
|---|---|---|
| 1=0.25 | 1=80 | 1=50 |
| 2=0.50 | 2=100 | 2=75 |
| 3=1.00 | 3=120 | 3=90 |
| 4=1.50 | 4=180 | 4=120 |
| 5=2.00 | 5=180 | 5=140 |
| 6=2.50 | 6=200 | 6=160 |
| 7=3.00 | 7=220 | 7=180 |
| 8=3.25 | 8=250 | 8=200 |
| 9=3.50 | 9=300 | 9=210 |

FIG. 3A

FIG. 6
LOGO
GAME DATA
GAME INFO
PROMO
53215002001401

FIG. 8
LOGO
GAME DATA
GAME INFO
PROMO
VALIDATION NO./CODE NO.

DISPENSING LOTTERY TICKETS

The present invention relates to a method of dispensing lottery tickets, to an apparatus for dispensing tickets and to an apparatus including an assembly of the tickets.

BACKGROUND OF THE INVENTION

Ticket vending machines for example those manufactured by Interlott Technologies Inc of Cincinnati, Ohio and American Games Inc. (now Pollard Games Inc.) of Council Bluffs, Iowa generally include an exterior housing which contains and secures the tickets and payment receptacle and which is accessible by customers for actuating switches on the housing for dispensing selected lottery tickets.

The lottery tickets are contained within separate containers within the housing each of which has a dispensing unit operable to dispense a ticket from a selected container in response to the actuation of the switches by the customer.

The control of the dispensing is effected by a control unit within the housing which is responsive to the actuation of the switches by the customers and responsive to the receipt of payment from the customers for dispensing the tickets.

Instant win lottery tickets can be provided either as scratch-off tickets or as pull tab (otherwise known as break-open) tickets. While the two above types of tickets are different in many respects both in regard to the manner of manufacture and in regard to methods of validation and control, the present invention is intended to be directed to both types of lottery tickets and the term "lottery ticket" as used herein is intended to cover both types and other types of lottery tickets which require dispensing in the same or similar manner as the above types.

Generally lottery tickets of the scratch off type are manufactured in a continuous strip which is then fan-folded for convenient supply. Generally break open type tickets are manufactured in individual ticket pieces which are then formed into a stack and dispensed one at a time from the bottom of the stack.

A machine for dispensing scratch off type tickets in fan folded form is manufactured by Interlott and has been available for many years. A machine for dispensing break open type tickets in stacked form also has been available for many years from American Games Inc and has been sold under the model PTVM. The construction, arrangement and operation of these models is well known to one skilled in the art and is incorporated herein by reference.

In addition a specific arrangement of dispensing arrangement proposed for use in a dispenser for the fan folded scratch off tickets is shown in U.S. patent application Ser. No. 09/873,811 filed Jun. 4, 2001 by many of the inventors herein and which is commonly owned with this application. This dispensing arrangement provides an arrangement for feeding an upper end of the strip of tickets to a feed system which acts to burst the perforations between each ticket and the next as each ticket is dispensed in turn. The construction and arrangement of this dispensing device is incorporated herein by reference.

The dispensing machines are generally maintained on the premises of a retailer so that the retailer is charged with the responsibility of filling the containers as necessary to maintain a continuous supply without shortages which would potentially reduce sales. It is necessary therefore for the containers to be refilled on a periodic basis, either shortly after a container has become empty or in order to anticipate the container becoming empty. The service person therefore is required to check the inventory of a container and to top up the supply within each container which may be empty or approaching empty.

The apparatus includes a control unit which monitors the inventory and controls the dispensing of the tickets in response to the manual actuation of the switches by the customers and in response to the submission of suitable payment by the customers.

Furthermore the control unit controls the operation of the dispensing unit of each container so as to forward the ticket to be dispensed to the required dispensing location. In regard to the scratch off type tickets which are generally supplied in a continuous strip, it is generally desirable to effect a bursting of the perforations between each ticket and the next so as to allow an individual ticket to be dispensed into a chute. This avoids any possibility of a customer improperly tearing a ticket or being able to pull an extended number of tickets from the supply. In order to effect the bursting action, it is necessary for the dispensing unit to have information concerning the length of the ticket from its leading edge at the previous perforation line to the trailing edge at the next perforation line so as to move the perforation line to the bursting position and so as to dispense the ticket. In regard to the break open type tickets which are conventionally supplied in individual ticket form, it is also necessary for the control unit to have information concerning the length of the ticket in order to ensure that the ticket is properly dispensed.

The marketing of lottery ticket involves generating attractive tickets of different game types to successfully convince the customer to purchase the particular game. For this purpose, different dimensions of tickets are manufactured including different widths and particularly different lengths so that tickets commonly vary in length from 2.0 inches up to 8.0 inches with many different lengths in between. The design of the ticket does not wish to be restricted to particular lengths since this could interfere with maximizing the attractiveness of the graphics on the ticket while minimizing the cost of the ticket.

In addition it is conventional to supply to the customers a selection of tickets of different prices so the customer may choose particular tickets not only based upon the attractiveness of the game but also upon the amount of money which the customer chooses to pay.

Yet further in view of the different dimensions of the tickets, the number of tickets supplied in a particular assembly or "book" of the tickets will vary widely.

The different games are identified by an individual game number so that each game can be quickly distinguished from the next by the lottery organization controlling the sale of the tickets.

In order to provide the customer with an appealing array of tickets from which to purchase, the dispensing machine generally although not necessarily includes a number of containers which can vary depending upon the particular size of dispensing machine required for example from 12 dispensing containers up to 24 dispensing containers. Each container generally therefore will be filled with a different game for selection by the customers. Generally the game selection remains constant so that it is necessary only for the service person to maintain the containers properly filled by adding into each container a fresh supply of the tickets associated with that container. However in addition it also necessary on occasion to change the game associated with a respective container when older games are cancelled and new games are brought in to replace those older games.

It is necessary for the control unit, for each container, to have input into the memory thereof information relating to the game including the game number, the price of the ticket, the total number of tickets in an assembly or book of the ticket and the length of the tickets between the perforation lines.

At the present time, the information relating to the above items is input into the control unit by the service person or store clerk using a keypad. Thus the service person must enter the numerical price of each of the items set forth above when changing the game. Also when adding tickets to the supply, it is necessary for the service person to ensure that the proper tickets are placed within the proper respective container so that the above prices are proper for the tickets within the container and must also enter into the control unit the number of tickets added.

It will be appreciated that the service person in the retail location is faced with between 12 and 24 different containers each containing a different game and each having different prices for the above items. There is therefore significant potential for error to be made leading to many difficulties. For example the input of the wrong ticket price could lead to tickets being sold at the wrong price with a considerable loss of revenue. For example the entry of the wrong number of tickets in the book may lead to inventory problems which are difficult to resolve. For example the entry of the wrong length of the ticket may lead the dispensing device to tear tickets at the wrong location leading to dispensing of part tickets or jamming of the dispensing device.

In order to assist the retailer in this regard it is common to provide prior to launch of a new game a data sheet or flyer which is provided to the retailers as a promotion for the new game. Such flyers often give information at separate parts of the flyer relating to the game number, price, number of tickets in the book and the length of the ticket.

As the length of the ticket can vary widely, in the absence of the flyer which is not arranged nor intended to be stored or supplied with the tickets, the technique used for entry of the length is generally to require the service person to actually measure the length of the ticket on a scale provided on the housing so that the service person reads off from the scale the actual numerical value of the length either in inches or centimeters and then enters that numerical value in the keypad. It will be appreciated that this measurement is troublesome, time consuming and leads to potential errors.

SUMMARY OF THE INVENTION

It is one object of the present invention to provide an improved and simplified arrangement by which information relating to the dispensing of the tickets is input into the control unit of the dispensing machine.

According to the invention there is provided a method of dispensing lottery tickets comprising:

- providing a plurality of dispensing containers each arranged to receive a plurality of lottery tickets in row for dispensing each in turn;
- providing at each container a dispensing device actuable to dispense each ticket in turn;
- mounting each container and its dispensing device within a housing accessible by a customer;
- providing on the housing customer actuable switches arranged for actuation by the customer for dispensing tickets from selected ones of the containers;
- providing in the housing a payment receiving device operable by the customer for effecting by the customer of a payment for selected tickets;
- providing a control unit within the housing;
- the control unit being arranged for operation by an authorised service person for controlling the filling of selected containers with respective selected tickets for dispensing;
- the control unit being arranged controlling the dispensing of the tickets in response to the actuation of the switches by the customer;
- when a container requires additional or replacement tickets, providing a quantity of tickets for insertion into the container;
- and inputting information into the control unit for the container into which tickets are to be inserted defining for the respective quantity of tickets:
  - a game number for a game provided on the tickets;
  - a price of the ticket;
  - a total number of the tickets making up the quantity of tickets;
  - and a length of the tickets from a leading edge of each ticket to a trailing edge thereof;
  - wherein the information defining the length of the tickets is input into the control unit from information provided in relation to the tickets without requiring the service person to enter the length on a key pad as a numerical length.

The tickets defined herein can be of the scratch-off type or break-open type as well known to one skilled in the art.

Preferably also the information defining the price of the ticket and the information defining the total number of tickets is input into the control unit from information provided in relation to the tickets without requiring the service person to enter the price on a key pad as a numerical price. In this arrangement, the information defining the price of the ticket and the information defining the length of the ticket are preferably input simultaneously into the control unit from the same information. In most cases also the game number will also be input simultaneously as part of the same data which is read into or entered into the control unit. This data may also include additional information such as ticket calliper, which may be required in the case where the same machine is selling single sheet tickets and laminated tickets, which are thicker.

In one preferred construction, the information defining the length of the tickets is provided in machine readable data provided to the service person in association with the quantity of tickets and wherein there is provided in the housing a code reader arranged to provide an input to the control unit by reading the machine readable data.

The code reader is preferably an optical reader which reads a "bar code" printed on the substrate providing the information, but other forms of machine readable data may be provided including those which are not read optically such as magnetic stripe scanners and other techniques known to one skilled in this art.

In this arrangement, the machine readable data can be provided on each ticket. Each such ticket may include validation machine readable data for use in validating the ticket after playing by the customer and wherein the machine readable data providing the information is provided as separate fields within a common machine readable code with the validation data.

Alternatively the machine readable data can be provided on a separate substrate or "setup card" provided with the quantity of tickets. Advantageously, there is provided in the housing a storage and display location associated with the respective container for receiving the setup card which includes information identifying the game on the tickets to the service person so that the setup card associated with each container can be displayed for showing to the service person the game associated with that container and for use by the service person in providing the machine readable data when adding to a container a quantity of tickets which are the same game number as the tickets already in the container. The location can be actually on the container or can be located separately but clearly associated with the container.

In one arrangement, the machine readable data includes at least the price, the length and the total number and also preferably the game number together with any other required data as actual numerical values as fields in the data. Alternatively the machine readable data includes the required data or values as coded values different from the actual numerical values as fields in the data and wherein the control unit includes a memory containing a table correlating the coded values with the actual numerical values.

In another alternative arrangement, there is provided a data connection from the control unit to a central data source, storing at the central data source a table in which each game number is associated with information relating to the tickets associated with that game number providing the price of the tickets; the total number of the tickets making up the quantity of tickets and the length of the tickets; and the service person acts to enter into the control unit the game number associated with a quantity of tickets to be inserted into a container; causing the control unit to retrieve from the central source the information relating to the tickets to be inserted and causing the control unit to control the dispensing from the container in response thereto.

In a yet further alternative, the information defining at least the a price of the ticket, the total number of the tickets making up the quantity of tickets and the length of the tickets is encoded into a data entry code different from and simpler than the numerical values of the information, wherein the data entry code is provided to the service person in association with the tickets to be inserted into the container, wherein the control unit includes a memory containing a table for decoding the data entry code and wherein the service person is caused to enter the data entry code into the control unit to provide to the control unit said information. In this arrangement, the data entry code can be provided on a game setup card supplied with the quantity of tickets or the data entry code can be provided on each of the tickets.

According to a second aspect of the invention there is provided a method of supplying lottery tickets comprising:

supplying at least one assembly of lottery tickets;

the assembly of lottery tickets being arranged for common transportation and storage;

the assembly of lottery tickets being arranged for common insertion into a dispensing container for dispensing therefrom sequentially for sale to customers;

the tickets having associated therewith a game number and a game price;

the tickets having a common length from leading edge to trailing edge;

the assembly having a predetermined total number of tickets;

and supplying with the at least one assembly a separate game setup card;

the game setup card having printed thereon data providing the game number, the game price, the ticket length and the total number in readily readable form for input into a dispensing machine;

the game setup card being shaped and arranged for display within the dispensing machine at a location associated with the assembly of tickets.

According to a third aspect of the invention there is provided a method of supplying lottery tickets comprising:

supplying at least one assembly of lottery tickets;

the assembly of lottery tickets being arranged for common transportation and storage;

the assembly of lottery tickets being arranged for common insertion into a dispensing container for dispensing therefrom sequentially for sale to customers;

the tickets having associated therewith a game number and a game price;

the tickets having a common length from leading edge to trailing edge;

the assembly having a predetermined total number of tickets;

and printing on each ticket readily readable data defining the length of the ticket.

According to a fourth aspect of the invention there is provided an apparatus for dispensing lottery tickets comprising:

a plurality of dispensing containers each arranged to receive a plurality of lottery tickets in row for dispensing each in turn;

at each container a dispensing device actuable to dispense each ticket in turn;

a housing accessible by a customer within which each container and its dispensing device is mounted;

customer actuable switches on the housing arranged for actuation by the customer for dispensing tickets from selected ones of the containers;

a payment receiving device in the housing operable by the customer for effecting by the customer of a payment for selected tickets;

a control unit within the housing arranged for operation by an authorised service person for controlling the filling of selected containers with respective selected tickets for dispensing and for controlling the dispensing of the tickets in response to the actuation of the switches by the customer;

a reader of machine readable data;

the control unit being connected to the reader and arranged to receive therefrom information for each container into which tickets are to be inserted defining for the respective quantity of tickets;

a game number for a game provided on the tickets;

a price of the ticket;

a total number of the tickets making up the quantity of tickets;

and a length of the tickets from a leading edge of each ticket to a trailing edge thereof.

According to a fifth aspect of the invention there is provided an apparatus for dispensing lottery tickets comprising:

a plurality of dispensing containers each arranged to receive a plurality of lottery tickets in row for dispensing each in turn;

at each container a dispensing device actuable to dispense each ticket in turn;

a housing accessible by a customer within which each container and its dispensing device is mounted;

customer actuable switches on the housing arranged for actuation by the customer for dispensing tickets from selected ones of the containers;

a payment receiving device in the housing operable by the customer for effecting by the customer of a payment for selected tickets;

a control unit within the housing arranged for operation by an authorised service person for controlling the filling of selected containers with respective selected tickets for dispensing and for controlling the dispensing of the tickets in response to the actuation of the switches by the customer;

and a plurality of card mounting receptacles provided in the housing at locations which are inaccessible to the customer for receiving and displaying to a service person having access within the housing a respective setup card, each receptacle being associated with a respective container so as to display the setup card in association with the container so as to provide data relating to the tickets in the container.

According to a sixth aspect of the invention there is provided an apparatus for dispensing lottery tickets comprising:

a plurality of dispensing containers each arranged to receive a plurality of lottery tickets in row for dispensing each in turn;

at each container a dispensing device actuable to dispense each ticket in turn;

a housing accessible by a customer within which each container and its dispensing device is mounted;

customer actuable switches on the housing arranged for actuation by the customer for dispensing tickets from selected ones of the containers;

a payment receiving device in the housing operable by the customer for effecting by the customer of a payment for selected tickets;

a control unit within the housing arranged for operation by an authorised service person for controlling the filling of selected containers with respective selected tickets for dispensing and for controlling the dispensing of the tickets in response to the actuation of the switches by the customer;

a telecommunications link for connection of the control unit to a central data source;

the control unit being arranged to connect to the central source and to receive therefrom in response to supply of a game number therefrom to the central source information defining for the respective quantity of tickets:

a price of the ticket;

a total number of the tickets making up the quantity of tickets;

and a length of the tickets from a leading edge of each ticket to a trailing edge thereof.

According to a seventh aspect of the invention there is provided an apparatus comprising:

an assembly of lottery tickets;

the assembly of lottery tickets being arranged for common transportation and storage;

the assembly of lottery tickets being arranged for common insertion into a dispensing container for dispensing therefrom sequentially for sale to customers;

the assembly having supplied therewith a game set up card having thereon printed information representative of a length of the tickets from a leading edge of each ticket to a trailing edge thereof;

the game setup card being shaped and arranged for display within a dispensing machine at a location associated with the assembly of tickets.

According to a eighth aspect of the invention there is provided an apparatus comprising:

an assembly of lottery tickets;

the assembly of lottery tickets being arranged for common transportation and storage;

the assembly of lottery tickets being arranged for common insertion into a dispensing container for dispensing therefrom sequentially for sale to customers;

each ticket having thereon printed information representative of a length of the tickets from a leading edge of each ticket to a trailing edge thereof.

BRIEF DESCRIPTION OF THE DRAWINGS

Embodiments of the invention will now be described in conjunction with the accompanying drawings in which:

FIG. 3A is a table of codes for printing on the card of FIG. 3 and for storage in the memory of the control unit of FIG. 5.

In the drawings like characters of reference indicate corresponding parts in the different figures.

DESCRIPTION OF THE PREFERRED EMBODIMENTS

Figure 1:
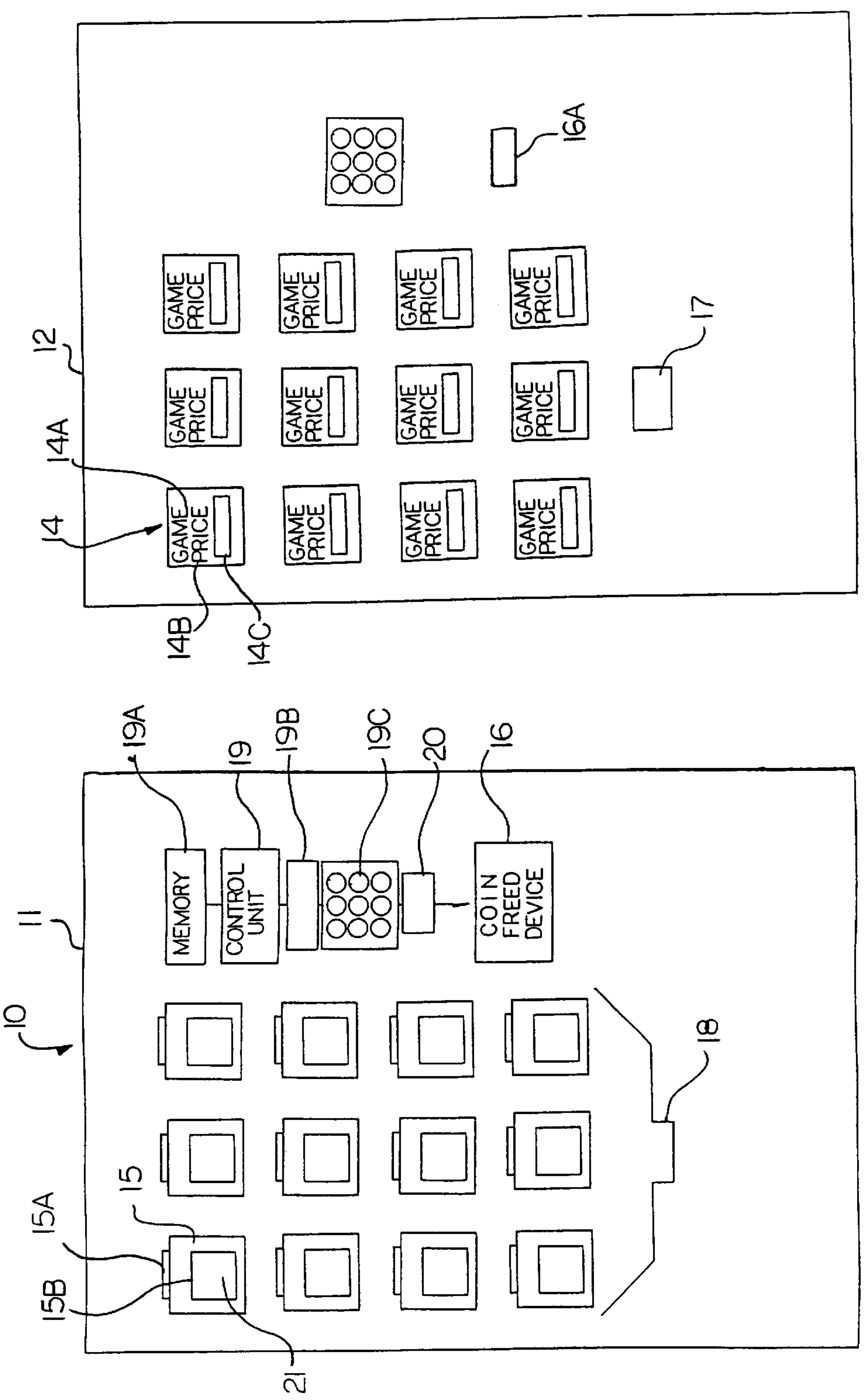
FIG. 1 is a front elevation showing schematically the components of a lottery ticket dispensing machine according to the present invention, the front door panel being shown separate for convenience of illustration.

In FIG. 1 is shown schematically a machine for dispensing lottery tickets. As described above machines of this general type have been manufactured for a number of years by Interlott and by American Games so that details of the machine construction are known to one skilled in the art from those publicly available machines.

The machine generally indicated at 10 includes a main housing 11 and a door 12. For convenience of illustration the door is removed from the main housing rather than hinged and is shown moved to one side so its front face is visible alongside the exposed front of the machine.

The front face of the door when the door is closed is presented to the customer and includes a plurality of game identification display locations 14 equal to the number of games stored within the main housing 11. Each game identification display location corresponds to a respective ticket dispensing container 15 within the main body 11. Thus in the example shown there are twelve such display locations 14 and twelve dispensing containers 15 although of course this number can vary., Each display location 14 includes graphics 14A identifying and promoting the game to the customer. Each location includes a display indicating a price 14B of the tickets of the game 14A so that the customer can choose the price of game to be played and can provide the required amount of money to select that particular game. Each location further includes a switch 14C which is actuable by the customer to effect dispensing of a ticket from the respective dispensing container 15.

In the embodiment shown the switches 14C are arranged at spaced positions across the front face so that each switch is directly adjacent the respective game information and price information. However it will be appreciated that the switches maybe congregated into a single location and associated with particular games by a number 1 to 12 identifying the respective game and its dispensing container 15.

In the embodiment shown, the game information and price are displayed on the door. In an alternative arrangement, the door may have openings to allow the game information displayed on the container 15 to be viewed thus simplifying the construction.

The door 12 of the housing further includes a feed slot 16A which cooperates with the location of a payment device 16, which may be a coin freed device as shown schematically or may receive bills or other method of payment such as credit card, debit card or tokens, within the main body 11 so that the customer can supply the required payment through the slot 16A to the device 16 to effect a payment for the selected tickets.

The door further includes a discharge opening 17 by which the customer can reach through the door to a trough 18 which collects the dispensed tickets from the actuated dispensing containers and collects those tickets for removal by the customer.

Within the main body 11 covered by the door 12 is provided a control unit 19 which is connected by suitable communication to the switches 14C, to the device 16 and to dispensing drive arrangements schematically indicated at 15A for each of the respective dispensing containers.

The details of the dispensing drive devices are shown in the above mentioned pending U.S. application, the disclosure of which is incorporated herein by reference so that no further description thereof is required herein.

The control unit 19 is shown only schematically and includes a memory 19A, a display 19B and a keypad 19C by which information can be introduced into the control unit and stored in memory for running a predetermined program within the control unit for effecting the functions set out hereinafter, as will be well apparent to one skilled in the art of electronic control units of this type.

The control unit also includes a reader 20 which is arranged to read machine readable characters. Many different types of such characters are available including what are conventionally known as bar codes in one dimension or two dimensional form and including a number of protocols of characters which are readable both in human alpha-numeric form and in machine readable form. Many examples are available for optical reader protocols to one skilled in the art and the present invention can use any of these as best suitable in the circumstance. Also other non-optical types of reader such as magnetic strip readers may also be used.

The reader is shown as associated with or attached to the control unit but may be located at any suitable position within the housing 10, either on the main body 11 or the door 12, with a suitable connection to the control unit. The reader thus provides an input to the control unit for inputting information from a scanned code provided on a suitable substrate as described hereinafter. Each of the containers 15 includes a storage location 15B for a game set up or game identification card 21 associated with the game of the tickets housed within the container 15. The receptacle 15B is defined by a pair of flanges each on a respective side of the card 21 so that the card can slide downwardly into the receptacle and be held against the front face of the rectangular container 15. Thus each container has on its front face identifying the game within the container a respective game set up card which shows to the service person the identification of the game within that container in a manner which is readily visible from the front of the main section 11 of the housing when the door is opened.

Figure 2:
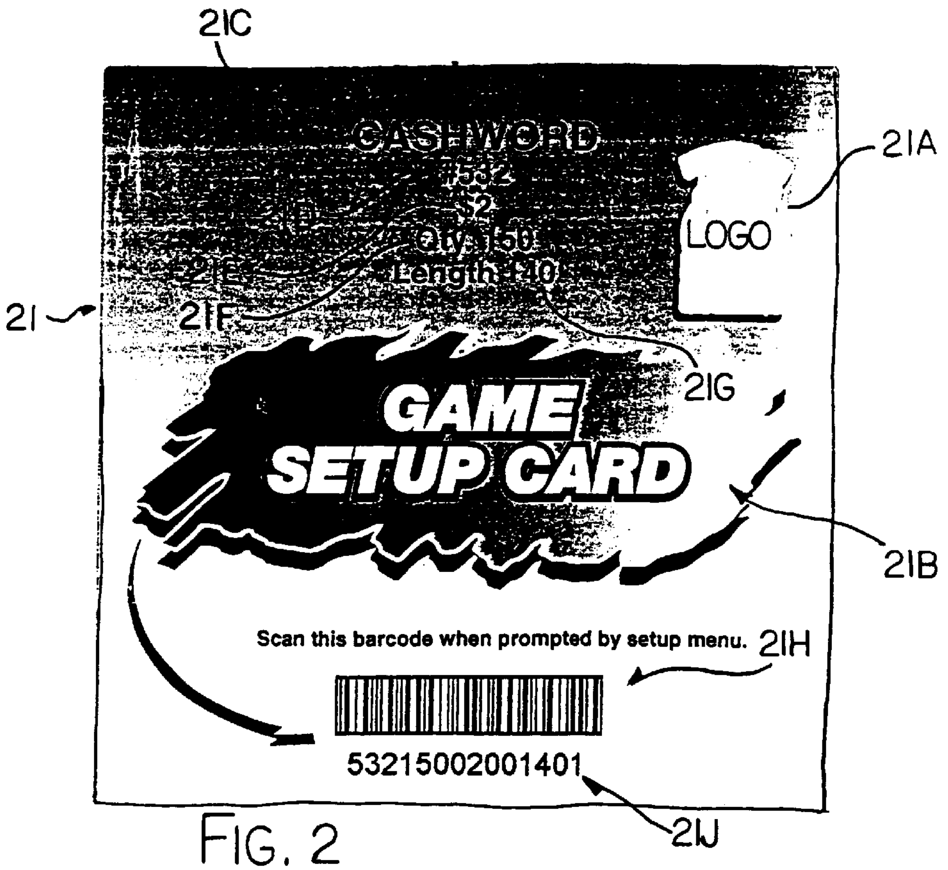
FIG. 2 is a front elevation of a game set up card of FIG. 1.

Turning now to FIG. 2, one of the game set up cards 21 is shown in front elevation and it will be appreciated that this set up card is one example of twelve different cards each identifying a respective game. The game set up card 21 includes a logo 21A identifying the manufacturer and/or the distributor or authority controlling the game. The card includes indicia 21B identifying that the card is the game set up card and thus is required to be installed in location on the front of the respective housing. The indicia may be generic as shown simply stating that the card is for game set up or the indicia may include the same promotional graphics or similar or part of the promotional graphics of the game tickets themselves so as to be more readily identified with the game. The card further includes the name or trademark identifying the game as indicated at 21C.

Yet further the card includes four items indicated at 21D, 21E, 21F and 21G printed together in a table so as to be immediately apparent and readily accessible providing information for the control unit for proper operation of the dispensing machine to dispense the particular game identified on the card. Thus as shown item 21D carries and identifies the game number which is a three digit number associated with the distributor or authority indicated at 21A.

The second item 21E defines the price of the ticket. In the example shown, this is indicated as "$2" but it will be appreciated that different prices in different monetary units can be selected including dollars and cents over a wide range of different prices as selected for the particular game as indicated at 21D.

A third item 21F identifies the number of tickets in a quantity of tickets or book of tickets which are supplied as a common package for insertion into the container. In view of the fact that tickets come in different sizes and different lengths, the number of tickets in a suitable volume for common transportation and storage varies. In the example shown the quantity or number of tickets is "150".

The fourth item identifies the length of the ticket. The length may be identified in inches, centimeters or arbitrary units, provided the control unit recognizes the length and can control the dispensing unit 15A using the length identified to properly dispense the length of the ticket as described in the above pending application. In the example shown the length is indicated as "140" which is provided in millimeters.

The game setup card further includes a machine readable code 21H and a corresponding numerical code 21J providing for the convenience of a reader the same number as provided in the code 21H. The human readable form indicated 21J is optional since the same numbers are set forth in effect in the information in items 21D through 21G. Thus it will be noted that the numerical code 21J includes the game number "532", the quantity "150", the price "0200" and the length "140". In addition the number 21J includes a check sum 1 which is a conventional system for ensuring accurate reading of the bar code 21H since the check sum is calculated by a suitable algorithm from the previous information numbers in the series of numbers. The bar code encoding of the number as shown at 21H is of the conventional bar code form known as "Interleaved 2 of 5" using thick and thin lines and using narrow and wide spaces between the lines as is well known. Other encoding systems can be used including 2D codes, particularly if it is desired to reduce the size of the code 21H to reduce the space taken up on the card by the bar code.

Figure 3:
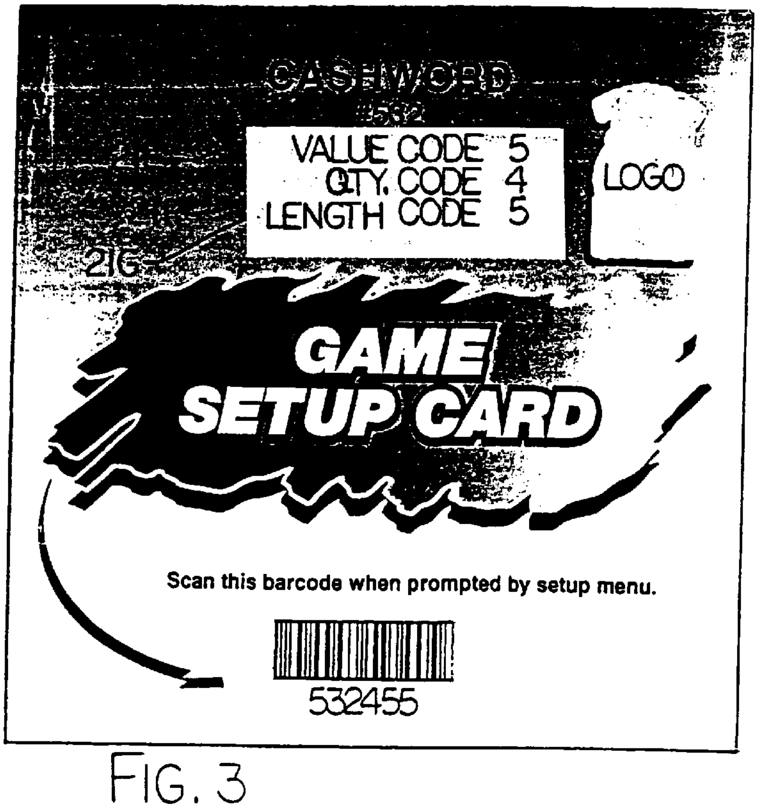
FIG. 3 is a front elevation of an alternative game set up card for use in the machine of FIG. 1.

In FIGS. 3 and 3A is shown an alternative arrangement of the game setup card. In this arrangement the items indicated 21E, 21F and 21G are modified so that they form a single digit code identified from the table 3A. It will of course be appreciated that the numbers set fourth in the table 3A are purely exemplary and do not necessarily represent actual examples which might be used but simply are shown to illustrate the principle.

Thus it will be noted that under the game number 532 is printed a price code 21E, a quantity code 21F and a length code 21G each which is selected from the table. The table is of course available electronically at the central control at the lottery authority, at the printer and is stored in the memory of the machine.

The codes 21E, 21F and 21G are then printed on the card in numerical form at the bottom of the card in a bar code which is accordingly simplified and shorter in view of the fact that game number comprises three digits and each of the three items set forth above are provided in single digit code form, making a total of only six digits.

The code form may include more than one digit, provided it is simpler and easier to input into the control unit than the numerical value itself.

In operation when the machine is set up and the games properly installed, it is necessary for the clerk only to periodically add tickets to those containers which are empty or are close to empty. The following steps are therefore followed by the clerk for refilling:

1) The clerk can visually scan the machine for empty containers or the clerk can run an inventory report from the control unit which will print for each container in a table the above items of game number, price, quantity in the container and length of the ticket. The clerk can therefor determine from the inventory report which containers require additional tickets. Alternatively the control unit is programmed so that when a container is emptied, the price indication on the door switches to zero to indicate to the customer that no tickets can be purchased from that game.

2) From a menu type system shown on the screen of the control unit, the clerk is prompted to select the function of "add tickets only".

3) When the menu for adding tickets only is selected, the clerk is prompted to select a required container where the inventory count is zero or close to zero.

4) After selecting a container to be filled, the clerk is prompted to add the tickets into the container and thread up the dispensing device. In the event that tickets remain in the container, these are connected to the leading end of the new strip of tickets by the conventional perforated tape which is applied over the joint between the trailing and leading ends to simulate the perforation line between the two tickets which can then be burst in conventional manner.

5) After the tickets are loaded the clerk is prompted by a message "scan ticket pack bar code now" and the control unit activates the scanner to allow reading of the bar code from the set-up card. The clerk then takes the existing card from the storage location on the front of the respective container and scans this under the reader so that the bar code is read by the reader to enter the information into the control unit.

6) The control unit checks to determine that the information concerning the game number corresponds to the game number already programmed for that container and in the event that it is inconsistent, provides an error message.

7) In the event that the game numbers are consistent, the control unit receives the quantity of tickets as read from the barcode and enters this into the inventory for that particular container so that the additional number of tickets now added is added to the inventory existing which may be zero or may be an existing number of tickets.

Thus the clerk is required only to check that the game number of the tickets entered into the container corresponds to the game number identified on the front of the container on the setup card and then to scan the setup card to provide all the necessary information to the control unit. The possibility for error is therefore significantly reduced and the time spent by the clerk is also significantly reduced thus dramatically improving efficiency in the operation of the machine.

When the clerk is instructed to load a new game in replacement for an existing game, or when initially setting up the machine, or to add a game to an otherwise empty container, the clerk carries out the following steps:

1) The clerk selects from the menu on the screen of the control unit "load new game".

2) The clerk is prompted to select a container and to enter the number of that container into the control unit via the keypad.

3) If the container currently includes tickets from an existing game, the clerk is prompted to zero the inventory and to remove the tickets.

4) The clerk is then prompted by a message stating "scan ticket pack barcode now".

5) After the bar code is scanned, a prompt for the correct ticket pack information appears, and if accepted as correct by the clerk, then the tickets are added to the inventory for that container.

6) The clerk then places the game set up card for the new game in its storage location associated with or on the front of the container into which the tickets have been added.

The set up of a new game therefore is simplified in that the clerk needs merely to identify the required container and to scan the set up card in relation to that container to enter the necessary information relating to the game tickets for that container, thus dramatically improving efficiency both in respect to time spent and the possibility for error.

The arrangement shown in FIG. 3 operates in the same manner using the same procedures with the exception that the control unit needs also to access the table within its memory after receiving the information from the scanned bar code in order to decode the data from the code numbers read from the scanned bar code in order to enter the necessary numerical values from the table.

Figure 5:
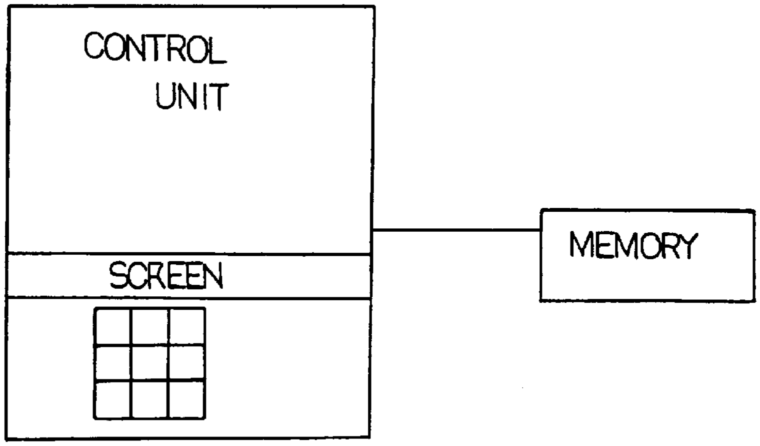
FIG. 5 is a schematic illustration of a control unit for use as a second alternative in the dispensing machine of FIG. 1.

In FIG. 5 is shown an alternative arrangement of the control unit which does not include a scanner for reading the machine readable code or characters.

Figure 4:
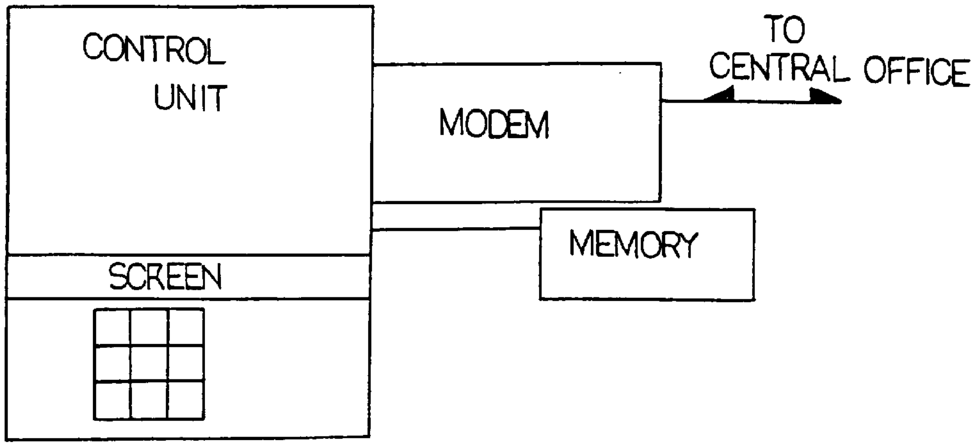
FIG. 4 is a schematic illustration of a control unit for use as a first alternative in the dispensing machine of FIG. 1.

In FIG. 4 is also shown a further alternative arrangement for a control unit which in place of the scanner provides a modem or other communication link to data at a central office.

The arrangement of FIG. 5 can be used in conjunction with the game set up card of FIG. 3 in that the clerk can readily enter the code numbers printed on the game set up card as opposed to the more complex numerical values. Thus the clerk needs to enter into the keypad only the six numerical values defined by the game number and one number each for the three additional values necessary for the control unit. The card may include only the human readable code or may include both the human readable form and the machine readable form for use in a system where some dispensing machines have the reader and some do not.

Again therefore the control unit looks to the table stored in the memory to extract from the table the required numerical values to allow the control unit to properly enter the required information in relation to the selected container and to operate that container to dispense the tickets.

The game set up card is a sheet of a suitable substrate material generally of thick paper or card which is printed on one side only with the information set forth above. The card is generally rectangular and dimensioned so that it can fit on the front of the container so as to be clearly associated with the respective container. While the slot mounting arrangement is desirable, other techniques for attachment of the card to the container can be used. The card is wholly associated with a single game in that it includes data relating only to the single game defining the four required values for the control unit to operate the system in relation to that game. The card therefore may be identified simply with the name of the game and the game number or may include more graphics more associated more closely with the game so as to make more clear which card is associated with which game to further avoid the possibility of error.

The set up cards are manufactured by the same printer as the tickets but are not connected to the tickets nor packaged with the tickets in wrapping material. Generally, the wholesaler will supply to the retailer with each order for one or more books of tickets or particular game a game set up card for use with that game.

In the arrangement shown in FIG. 4, an alternative operation is utilized to enter the required values into the memory of the control unit. In the arrangement of FIG. 4, there is a telecommunications link between the dispensing machine and the control unit thereof and the central office. In this arrangement the clerk is prompted to enter into the keypad entry system simply the game number from the particular game concerned. The control unit is then programmed to communicate with the central office to extract from the central office a record of the other three items required for operation of the control unit. Thus the control unit communicates the game number and a response is provided from the central office providing the quantity of tickets, the price of the tickets and the length of the tickets. This information is required at new game setup and thus is provided as part of the new game set up protocol. This information may also be provided as a check in adding tickets to an existing game or may be bypassed on the assumption that the data relating to the tickets is the same as is already entered into the control unit in respect of that container for the tickets already present.

Figure 6:
FIGS. 6, 7 and 8 are front elevations of three separate alternative lottery tickets for dispensing in the machine of FIG. 1.

Turning now to FIG. 6, there is shown a first embodiment of lottery ticket in which the bar code previously shown as printed on a game set up card is instead printed directly onto the lottery ticket itself. Thus the bar code, as shown, provides the same series of numerical values for the four items required for the control unit. The bar code and the series of numerals printed on the ticket are the same for each ticket so that they can be printed without computer control of variable image printing processes. The same procedure as set forth above is therefore used for the ticket of FIG. 6 except that a ticket from the book is scanned by the reader rather than the game set up card. In this arrangement the game set up card may be simply a conventional promotional card which includes information identifying the ticket and the game but does not include any of the above data, or may be omitted altogether. Thus, when provided for the convenience of the clerk, the promotional card may be stored in the required location on the front of the container to identify the tickets within the container but the card remains in place during adding of additional tickets since the bar code on the ticket is scanned rather than a bar code on the set up card.

Figure 7:
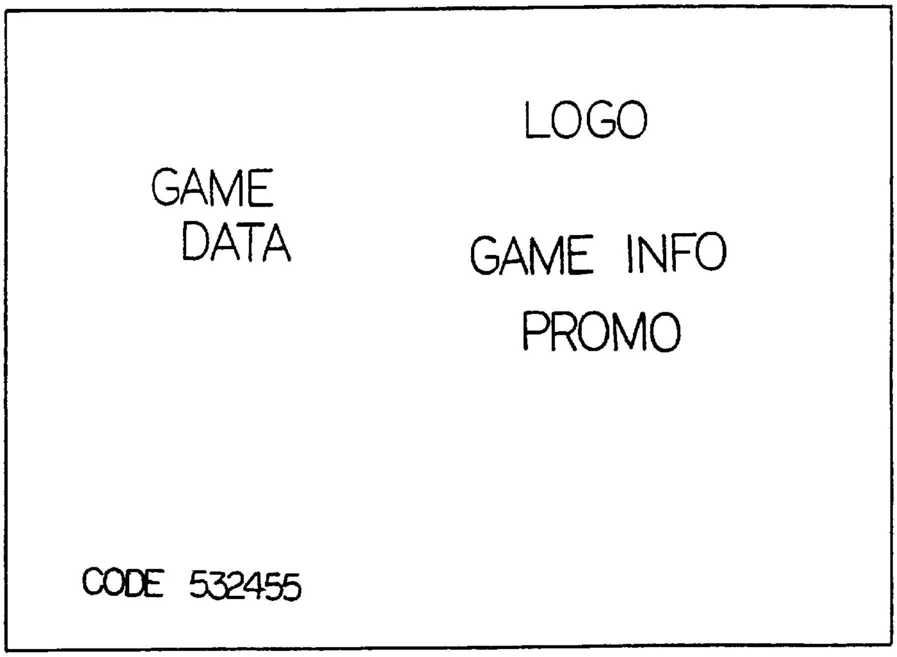

In FIG. 7 is shown an arrangement in which the numerical code of FIG. 3 is printed directly on the ticket. Thus the clerk uses the ticket of FIG. 7 in association with the control unit of FIG. 5 where, instead of reading a bar code, the simplified form of the information provided by the table of FIG. 3 is entered and the control unit extracts the required numerical values from the tables stored in the memory.

Figure 8:

Turning now to FIG. 8 there is shown a yet further arrangement of lottery ticket in which the bar code printed on the ticket includes both a section defining a validation number for that ticket and also provides the necessary values as set forth above, either in numerical form or in code form, all as separate fields of a single bar code. Thus again the ticket of FIG. 8 is used in place of a game set up card carrying a bar code and the clerk uses the individual ticket to scan by the reader to enter the necessary values into the control unit as set forth above. However the same bar code structure has additional fields providing a conventional validation number which is used after the game has been played in a validation scanning reader to check whether the bar code on the ticket properly relates to a winning ticket and to confirm that via the reader to the clerk.

The validation process is conventionally available to the clerk to rapidly check that a purported winning ticket is properly a winning ticket and to provide also the value of the winning amount. The reader for the validation process generally will be a separate machine from the dispensing machine. However a combined machine which has a common scanner for both dispensing and validating may be an option. The bar codes may be printed on the front or back or both of the ticket as required in the particular circumstances, as determined by the design of the graphics and information and as determined by the type of printing process employed.

The control unit may include conventional arrangements for test procedures using void tickets to allow the clerk to test the proper dispensing of the tickets and may include menus which allow the clerk to enter additional adjustments and modifications to effect proper control of the dispensing of the tickets. However these arrangements are of a conventional nature and will not be described in detail herein.

While the preferred embodiments of the invention have been described above, it will be recognized and understood that various modifications may be made therein, and the appended claims are intended to cover all such modifications which may fall within the spirit and scope of the invention.

What is claimed is:

1. A method of supplying lottery tickets comprising:

providing a plurality of dispensing containers each arranged to receive from a set of lottery tickets a plurality of lottery tickets of the set in a row for dispensing each in turn;

providing a control unit;

the control unit being arranged for operation by an authorised service person for controlling the filling of selected containers with respective selected tickets for dispensing;

providing a reader of machine readable data for supplying machine read data to the control unit;

providing for each set of lottery tickets stored in a respective container a lottery game set-up substrate separate and distinct from the lottery tickets and having printed thereon information relating to the tickets of the respective set;

providing for each container a storage and display holder associated with the respective container for receiving and displaying the separate game set-up substrate;

and, when a container requires additional or replacement tickets, providing a quantity of tickets for insertion into the container and inputting information into the control unit for the container into which tickets are to be inserted and for the respective quantity of tickets;

wherein at least some of the information is input into the control unit by providing said at least some of the information in machine readable data on the game setup substrate and moving one of the game set-up substrate and the reader relative to the other for reading the information on the substrate by the reader.

2. The method according to claim 1 including providing at each container a dispensing device actuable to dispense each ticket in turn and providing switches arranged for dispensing tickets from selected ones of the containers, wherein the control unit is arranged to control the dispensing of the tickets in response to the actuation of the switches.

3. The method according to claim 1 wherein the information in machine readable data on the game set-up substrate includes a game number for a game provided on the tickets, a price of the ticket and a total number of the tickets making up the quantity of tickets.

4. The method according to claim 1 wherein the information in machine readable data on the game set-up substrate includes a length of the tickets from a leading edge of each ticket to a trailing edge thereof.

5. The method according to claim 1 wherein the information in machine readable data on the game set-up substrate includes a game number for a game provided on the tickets, a price of the ticket, a total number of the tickets making up the quantity of tickets and a length of the tickets from a leading edge of each ticket to a trailing edge thereof.

6. The method according to claim 5 wherein the information is included as actual numerical values as fields in the machine readable data.

7. The method according to claim 5 wherein the machine readable data includes the price, the length and the total number as coded values different from the actual numerical values as fields in the data and wherein the control unit includes a memory containing a table correlating the coded values with the actual numerical values.

8. The method according to claim 1 wherein the storage and display holder for each container is provided on the respective container.

9. The method according to claim 1 wherein the game set-up substrate is readily removable from the respective holder and is moved from the holder to the reader.

10. Apparatus for supplying lottery tickets comprising:

a plurality of dispensing containers each arranged to receive from a set of lottery tickets a plurality of lottery tickets of the set in row for dispensing each in turn;

a control unit;

the control unit being arranged for operation by an authorised service person for controlling the filling of selected containers with respective selected tickets for dispensing;

a reader of machine readable data for supplying machine read data to the control unit;

and a plurality of substrate mounting holders mounted at locations for receiving and displaying, to an authorized service person, a respective game setup substrate separate and distinct from the lottery tickets, each holder being associated with a respective container so as to display the setup substrate in association with the container at a location separate from the tickets in the container;

the reader and the control unit being arranged to read machine readable data providing information relating to the tickets;

whereby at least some of the information is input into the control unit by providing said at least some of the information in machine readable data on the game setup substrate and moving one of the game set-up substrate and the reader relative to the other for reading the information on the substrate by the reader.

11. The apparatus according to claim 10 wherein each container includes a dispensing device actuable to dispense each ticket in turn and there are provided switches arranged for dispensing tickets from selected ones of the containers, wherein the control unit is arranged to control the dispensing of the tickets in response to the actuation of the switches.

12. The apparatus according to 10 wherein the storage and display holder for each container is provided on the respective container.

13. The apparatus according to claim 10 wherein the storage and display holder for each container is arranged such that the game set-up substrate is readily removable from the respective holder and is movable from the holder to the reader.

14. The apparatus according to claim 10 including an assembly of lottery tickets arranged for common transportation and storage, the assembly of lottery tickets being arranged for common insertion Into a selected one of the dispensing containers for dispensing therefrom sequentially for sale to customers, the tickets having associated therewith a game number for a game provided on the tickets, a price of the ticket and a total number of the tickets making up the assembly, and a game set up substrate separate and distinct from the lottery tickets having thereon printed information in machine readable form representative of the game number of the tickets, the price of the tickets and the total number of tickets in the assembly, the game setup substrate being mounted in the mounting holder of the selected one of the containers.

15. The apparatus according to claim 14 wherein the information is included as actual numerical values as fields in the machine readable information and the reader and the control unit are arranged to input the information therefrom.

16. The apparatus according to claim 14 wherein the machine readable information is defined as coded values different from the actual numerical values as fields in the information and the reader and the control unit are arranged to input the information therefrom.

17. The apparatus according to claim 10 including an assembly of lottery tickets arranged for common transportation and storage, the assembly of lottery tickets being arranged for common insertion into a selected one of the dispensing containers for dispensing therefrom sequentially for sale to customers, the tickets having a length of the tickets from a leading edge of each ticket to a trailing edge thereof, and a game set up substrate separate and distinct from the lottery tickets having thereon printed information in machine readable form representative of the length of the tickets, the game setup substrate being mounted in the mounting holder of the selected one of the containers.

18. The apparatus according to claim 17 wherein the machine readable information includes a game number for a game provided on the tickets, a price of the ticket, a total number of the tickets making up the assembly and the length.

19. The apparatus according to claim 18 wherein the information is included as actual numerical values as fields in the machine readable information.

20. The apparatus according to claim 18 wherein the machine readable information includes the price, the length and the total number as coded values different from the actual numerical values as fields in the information.

* * * * *